Nov. 23, 1948.    E. V. GARNETT    2,454,554
AUTOMOBILE TRANSPORTING TRUCK
Filed July 27, 1946    3 Sheets-Sheet 1
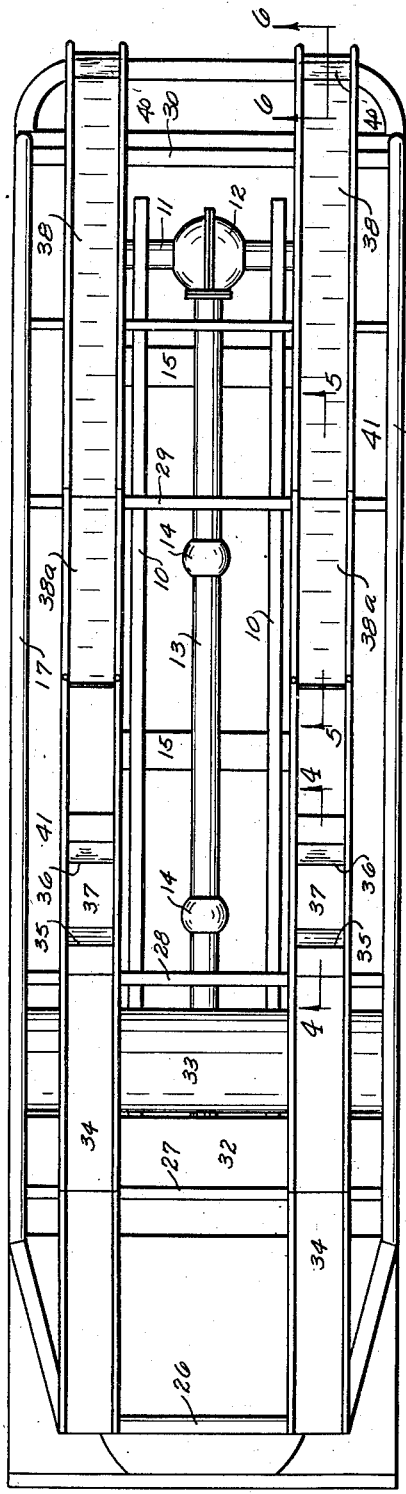
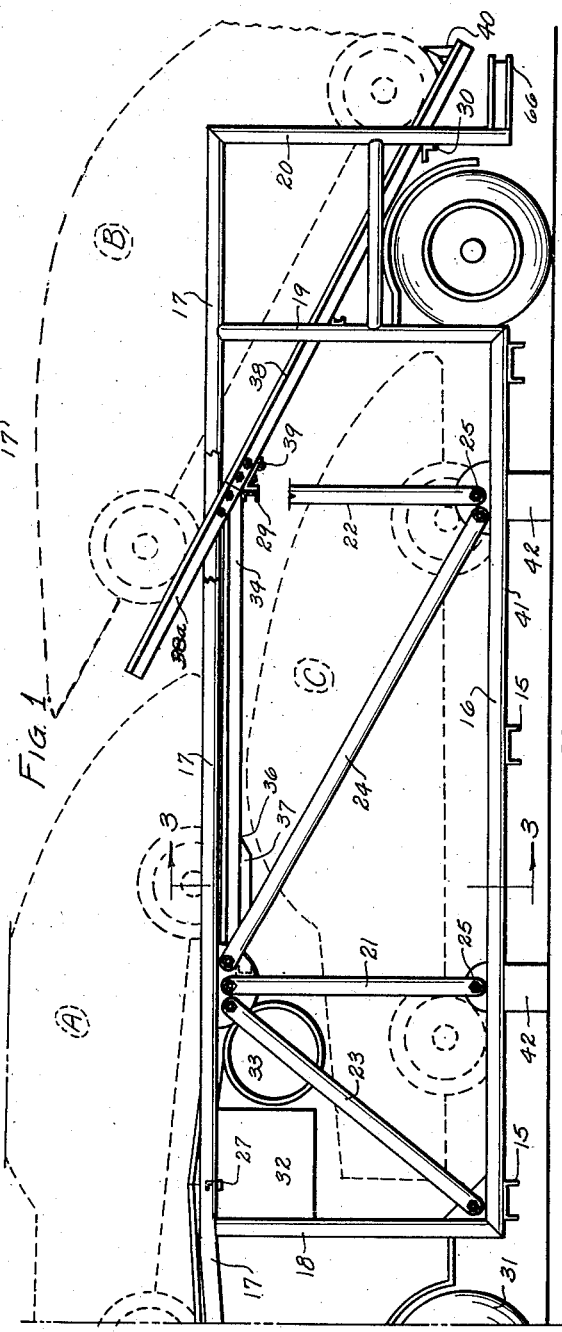
INVENTOR:
EDWARD V. GARNETT
BY Martin E Anderson
ATTORNEY Nov. 23, 1948.  E. V. GARNETT  2,454,554
AUTOMOBILE TRANSPORTING TRUCK
Filed July 27, 1946  3 Sheets-Sheet 2

INVENTOR:
EDWARD V. GARNETT
BY Martin E. Anderson
ATTORNEY

Nov. 23, 1948.  E. V. GARNETT  2,454,554
AUTOMOBILE TRANSPORTING TRUCK
Filed July 27, 1946  3 Sheets-Sheet 3
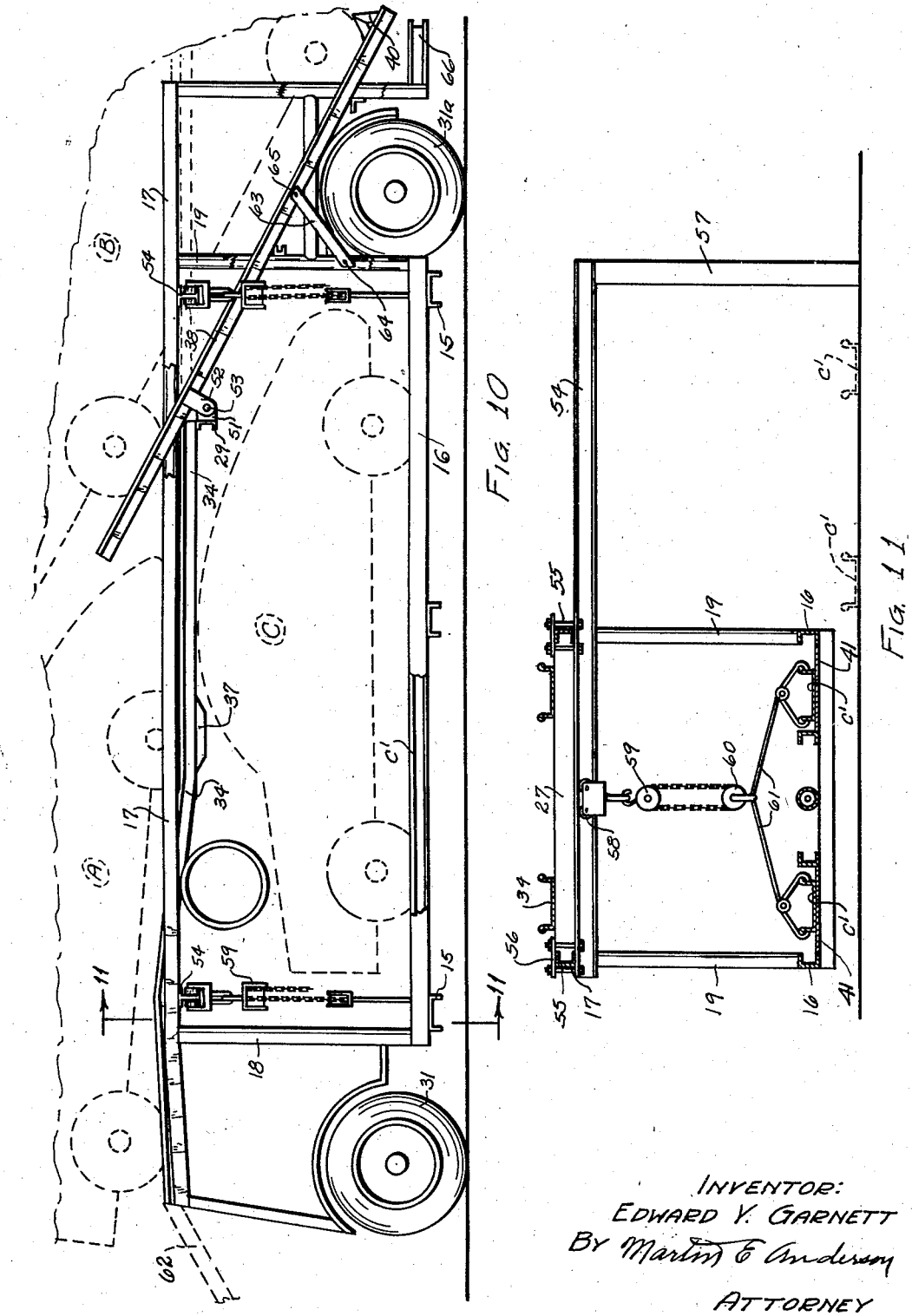
INVENTOR:
EDWARD V. GARNETT
BY Martin E Anderson
ATTORNEY Patented Nov. 23, 1948

2,454,554

REISSUED

UNITED STATES PATENT OFFICE 2,454,554

AUTOMOBILE TRANSPORTING TRUCK

Edward V. Garnett, Denver, Colo.

Application July 27, 1946, Serial No. 686,749

2 Claims. (Cl. 296—1)

1

This invention relates to improvements in trucks and has reference more particularly to a truck of the type employed in transporting automobiles.

It is quite customary to transport automobiles by trucks, instead of by train, and for this purpose various types of trucks have been invented.

It is evident that in order to keep the cost of transportation down and enable the truck owner to obtain a reasonable profit at a cost which is less than the cost of transporting automobiles by train, more than one automobile must be transported at a time.

The various States have rules and regulations limiting the height, width and length of transports, and in accordance with these regulations it has been practically impossible to transport more than four automobiles at one time, two being carried by the tractor and two by the trailer or none by the tractor and four by the trailer.

It is evident that the cost of transporting five automobiles at a time would not be appreciably more than the cost of transporting four automobiles, and therefore, if a truck can be designed so as to make it practical in connection with a trailer to transport five automobiles and still remain within the limits prescribed by the traffic regulations, the truck owner can collect the additional freight for one automobile with substantially the same expense, thereby increasing his profit without adding to the cost of freight per automobile.

It is the object of this invention to produce a truck of such a construction that three automobiles can be transported on the tractor and leave the latter of such length that when a trailer capable of transporting two automobiles is attached, the length of the tractor and trailer will not exceed the prescribed limits.

Automobile transporting trucks have been designed so that four automobiles may be carried by the tractor or truck, but such trucks are of such length that no trailer can be attached, and therefore the number of automobiles carried per unit assembly does not exceed four, whereas with the present construction, although the tractor unit carries three automobiles, it is so designed that its length permits a trailer carrying two automobiles in addition, to be attached.

Having thus briefly described the objects of the invention, the invention itself will now be described in detail and for this purpose reference will be had to the accompanying drawings in which the invention has been illustrated, and in which:

Figure 1 is a top plan view of the tractor or the truck carrying the power unit, various features that are common and well known having been omitted in the drawing so as to simplify it and permit the essential features to be more clearly shown;

Figure 2 is a side elevation of the truck shown in Figure 1;

Figure 10 is a view showing a slightly modified form of construction; and

Figure 11 is a section taken on line 11—11, Figure 10.

Figure 3:
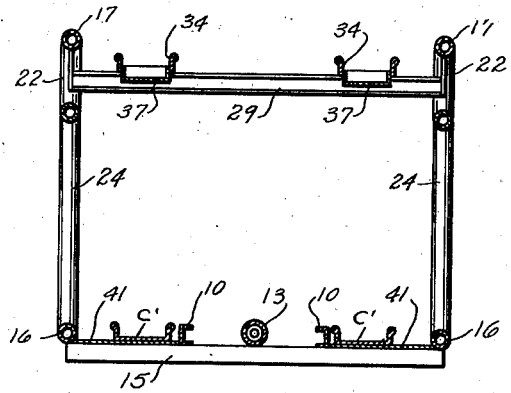
Figure 3 is a vertical cross section taken on line 3—3, Figure 2.

The truck that forms the subject of this invention is provided with a chassis frame, the two parallel side members of which have been shown in Figure 1 and designated by reference numeral 10. The rear axle has been designated by reference numeral 11, the differential by reference numeral 12, and the torque tube by reference numeral 13. The engine is positioned underneath the cab in the usual way and has not been shown. The torque tube and shaft are provided with several universals that have been designated by reference numeral 14. As many universals as may be found desirable may be employed.

Extending across the chassis frame are several channels that have been designated by reference numeral 15 and these support a frame having two substantially identical sides constructed in the manner shown in Figure 2, each having a tubular bottom member 16, a corresponding top member 17, vertical members 18, 19 and 20 and a bridge work comprising compression members 21 and 22 and tension members 23 and 24. Members 21 to 24, inclusive, are secured to one of the side frames by means of bolts 25, so as to be readily removable. The purpose of this removability will appear hereinafter. Top frame members 17 are interconnected by transverse members 26, 27, 28 and 29. As many more transverse members as may be found necessary or desirable may be used. Those shown are believed to be sufficient for the ordinary truck of this type. A transverse member 30 is positioned at some distance below the top rail as shown in Figure 2 and may either be a round pipe or an angle iron. The cab, as above stated, is positioned above the front wheels 31; directly back of the cab and underneath the top frame members is a compartment that has been designated by reference numeral 32 and contains a bed for use of one of the drivers while the other is operating. Directly back of the sleeping compartment is an auxiliary gas tank 33.

Supported on the top of the frame are two tracks 34. The front ends of tracks 34 rest on the transverse member 26. These pass over and rest on transverse members 27 to the rear of which the track is downwardly inclined to point 35. At this point the bottom is removed to point 36 and a pan 37 is positioned in the opening thus formed in a manner illustrated in Figure 4. The two tracks 34 then extend rearwardly and rest on the transverse member 29.

One automobile may be supported on the two tracks that have just been described and will occupy the position A indicated by dotted lines in Figure 2, the rear wheels resting in pans 37.

To the rear of tracks 34 are two tracks of a similar construction which have been designated by reference numeral 38. These terminate at the top of transverse channel 29 and are secured to the latter by angle brackets 39. Tracks 38 incline downwardly and rest on the transverse member 30 and extend rearwardly of the latter, as shown in the drawing. The size and shape of tracks 38 are the same as those of tracks 34. Attached to the upper end of each track 38 is an extension 38a which projects upwardly to a considerable distance above the corresponding track 34. The total length of tracks 38 and 38a is sufficient to accommodate the automobile which has been designated by B, this automobile being held in place by means of chocks 40. It will be observed from an inspection of Figure 2, that the rear end of automobile A extends underneath the upward projections 38a so as to form an overlap at this point. This is an important feature of the construction because by arranging the tracks so that the two automobiles can occupy the position shown in Figure 2, in which position the front end of automobile B overlaps the rear end of automobile A, it is possible to limit the length of the tractor body to such an extent that a trailer can be attached which has a capacity of two automobiles.

A third automobile, which has been designated by reference character C, is positioned inside of the frame and rests on bottom plates 41. In order to introduce automobile C, it is necessary to remove the bridge members 21 to 24, inclusive, and these have been attached by means of bolts in the manner above explained. When the bridge members are removed, the frame is weakened to some extent and during the loading and unloading, blocks 42 may be positioned underneath the frame member 16 on that side. During the time that these bridge members are removed, automobile C is introduced by the use of skids and dollies or in any other suitable way and it may even be bodily lifted by man power and moved into position. After automobile C has been inserted into the place provided therefor and blocked by means of suitable chocks, the bridge members are reapplied and blocks 42 removed. Of course it is obvious that jacks, such as ordinary automobile jacks, mechanical or hydraulic, can be substituted for blocks 42.

After the truck with its load has reached its destination, the automobiles positioned on the top, namely, A and B are first removed, after which the bridge members are removed and automobile C removed.

In order to make the loading simple, tracks 38 have been formed in two sections, as above intimated. Sections 38a have downwardly extending plates 43 that are bolted to the sides of tracks 38, as indicated at 44. When the extensions 38a have been removed, it is possible to load automobile A from the rear by attaching to the front end thereof a rope or cable forming part of a differential hoist or a block and tackle mechanism. After automobile A has been brought into position, the extensions 38a are reapplied and automobile B is brought into position by the hoisting mechanism and secured by chocks 40 and by any other additional means. In unloading automobile B is, of course, first unloaded, after which extensions 38a are removed and automobile A is unloaded by rolling it rearwardly.

Of course it is possible to dispense with the removable extensions 38a, but in that case automobile A would have to be loaded and unloaded from the front of the truck which would be more difficult and require ramps of greater length and greater inclination. The removable extensions 38a are therefore considered to be of great importance, although not absolutely essential.

Figure 4:
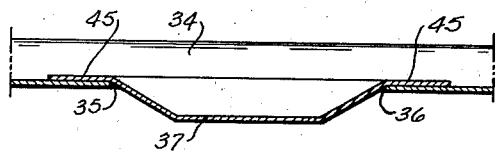
Figure 4 is a section taken on line 4—4, Figure 1, and shows the removable pan in position.
Figure 9:
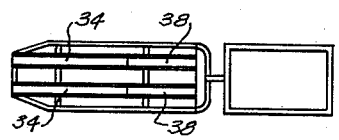
Figure 9 is a diagram showing the truck and trailer in assembled relation.

Referring now more particularly to Figure 4, it will be seen that tracks 34 have a portion of the bottom cut out as explained above and a pan 37 shaped to fit into the opening is provided. This pan has extending ends 45 that overlap the bottom of tracks 34. The pans form depressions for the reception of the rear wheels of automobile A.

Figure 5:
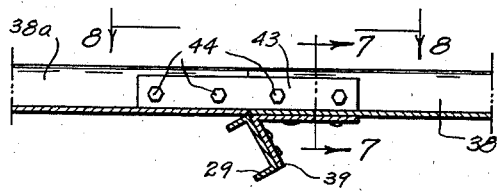
Figure 5 is a section taken on line 5—5, Figure 1, and shows the inclined track.
Figure 7:
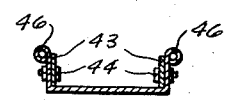
Figure 7 is a section taken on line 7—7, Figure 5.
Figure 8:
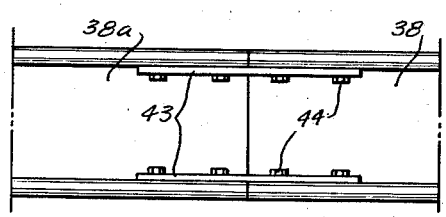
Figure 8 is a top plan view of a portion of the trough showing the two sections in assembled relation.

In Figures 5, 7 and 8, a construction is shown by means of which the removable extensions 38a may be attached to the tracks 38. In this proposed construction, plates 43 are connected with the sides of the two trough sections by means of bolts 44. The plates which are in the nature of "fish plates" may be permanently attached to one of the track sections. Although the construction shown for effecting a connection between the two sections is substantial and practical, it is to be understood that any other suitable means of effecting this interconnection may be employed.

The sides of the tracks are either rolled as indicated at 46, or an ordinary gas pipe may be welded to the vertical sides to give the tracks rigidity.

Figure 6:
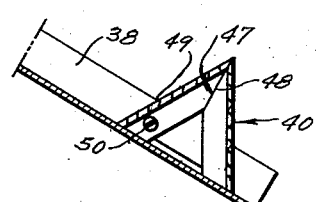
Figure 6 is a section taken on line 6—6 of Figure 1, and shows the wheel chock in position.

Chock 40, shown in Figure 6, is formed from angle irons 47 that are welded along 48 and are provided on at least one side with a plate 49. The chock is secured in position by means of a removable bolt or rod 50.

In Figure 10, the bridge members 21 to 24 have been omitted and the lower side members 16 have been selected of greater strength than those shown in Figures 1 and 2 so as to make the bridging unnecessary.

The tracks 38 which, in Figure 2, have been shown as rigidly attached to cross beam 29, are here hingedly connected to beam 29, which is provided with lugs 51 that cooperate with the downwardly extending plates 52 secured to track 38. A pivot pin 53 connects members 51 and 52 so as to form a hinge. The hinge is so proportioned that tracks 38 may be moved upwardly into the dotted line position shown in Figure 10, in which position the upper ends of the tracks will lie in the rear ends of tracks 34. The purpose of this hinged construction will appear as the description proceeds.

After the bridge members 21 to 24 have been removed, or, if the truck is made of such strength that such members are not necessary, car C can be loaded from the side in the following manner.

First of all, the pans 37 are removed and tracks 38 are moved upwardly into dotted line position. Two I-beams 54 are then attached to the upper frame members 17 by bolts 55 and straps 56, as shown in Figure 11, or by other suitable means. The I-beams are of such length that they extend to the side a distance which is greater than the width of an automobile and the outer ends are supported by posts 57. Tracks C' that are constructed in a manner similar to tracks 34 and 38, are now placed on the ground along the side of the truck and spaced so as to receive the wheels of the automobile that is to be loaded, somewhat as indicated by dotted lines in Figure 11. On each I-beam is mounted a truck 58. Such trucks are available on the market and are employed in a similar manner. Suspended from the truck is a chain hoist 59 and the lower pulley 60 of the chain hoist is connected by means of cables or chains 61 to tracks C' in a manner shown in full lines in Figure 11. Car C is now supported on track C' and the latter are attached to the I-beams 54 by means of the chain hoists. By manipulating the chain hoists in a well known manner, the tracks C' and the automobiles supported thereon are lifted so as to clear the side member 16 after which the car is pushed towards the left into the truck, whereupon it is lowered by a reverse operation of the hoists until the tracks C' occupy the solid line position of Fig. 11. Before car C is pushed into the frame, pans 37 are removed so as to give the maximum head room. After the car is in place, pans 37 may be replaced in tracks 34 and since they are well to the side of the frame, they stradle the body of car C and will therefore not interfere with it after it is in position. After car C is positioned as shown, it is bolted to the frame in any approved manner so as to assure that it will remain in position. After car C has been loaded in the manner described, car B is next loaded and this is preferably effected in the following manner.

Tracks 38 are lifted in elevated position as shown by dotted lines in Figure 10, and are supported by suitable means such as posts, two ramps 62 are now put into position in front of the truck so as to be in alignment with tracks 34. Car B is then driven up along ramps 62 and over tracks 34 and onto tracks 37 until the front wheels abut the chock 40. Before car B is loaded, pans 37 are put into place and covered with a steel plate so as to prevent the wheels of car B from dropping into the pans when it is moved onto tracks 38. After car B has been positioned on tracks 38 and firmly attached, tracks 38 are then lowered about pivot 53 until it assumes a position like that shown in Figure 10, when struts or braces 63, which have one end bolted to the uprights 19 at 64, are connected with tracks 38 by means of bolts 65. Car B is now in the position it occupies during transportation and it will be observed that it extends rearwardly, substantially to the rear of bumper 66.

Car A is now loaded in the following manner. The ramps 62 being still in position, car A is backed upwardly along these ramps and onto tracks 34, the plates covering pans 37 having in the meantime been removed. When the rear wheels reach pans 37, they drop into these pans, whose inclined ends serve as chocks to hold the car from longitudinal movement. It may, of course, be secured in position by other suitable means so as to make it impossible for the car to move substantially during transportation. When the rear wheels of car A move into the pans, the rear end of the body drops and the parts are so proportioned that the rear end of car A laps the upper end of car B and is positioned underneath tracks 38 and 38a in the manner shown in the drawings.

Attention is also called to the fact that the front ends of tracks 34 are downwardly inclined so that car A will set as low as possible after it has been loaded.

Although car B is preferably loaded in accordance with the method above described, it is evident, however, that it may be loaded by placing the tracks 38 in the full line inclined position shown in Figure 10 and then connecting with the lower ends the ramps 62. Car B may now be driven by its own power or pulled by means of suitable tackle or by horses, or otherwise upwardly until it reaches the dotted line position, after which the chocks 40 are put into place. With this construction tracks 38 would not require the hinged connection with the frame. Since the I-beams 54 at the rear occupy a position normally occupied by tracks 38, it is necessary to raise them into dotted line position in order to secure the rear I-beam to the frame. I-beams 54 are, of course, removed after car C has been loaded.

After the truck has reached its destination, car B is first unloaded by removing the chocks and running it onto suitable ramps, and thereafter car A is unloaded. The I-beams 54 are now put into position, together with the chain hoists and car C is lifted and moved outwardly to a position outside of the truck, whereupon it is lowered onto the ground and driven away.

As has already been pointed out, by means of this construction it is possible to transport three cars on the tractor and bring the total length of the tractor and trailer within the statutory limit of forty-five feet, which is the maximum length permitted in most states.

The inclination of the ends of pans 37 is preferably such that the car can move out under its own power.

It is, of course, understood that after the cars have been positioned on the tracks, they are secured by suitable tiedowns in the manner now common.

The constructions illustrated on the drawings and described herein may be varied in nonimportant details, but must retain a construction in which cars A and B are arranged in overlapping position. The frame of structural steel employed may be selected from those now available, but must be of sufficient length and strength. The methods of loading that have been described may be varied as the object is to load the automobiles into the approximate positions shown.

Having described the invention what is claimed as new is:

1. An automobile transporting truck comprising: a chassis; front wheels supporting the front end of said chassis; rear wheels supporting the rear end of said chassis; a first automobile-supporting track extending substantially horizontally between said front and back wheels to carry a first automobile; a second automobile-supporting track positioned above said first track to carry a second automobile above the first automobile, said second track extending substantially horizontally from a position over said front wheels and forwardly of the forward extremity of said first track and terminating at its rear extremity forward of the rear extremity of said first track; a third automobile-supporting track extending rearwardly and downwardly, from a position in the plane of, and rearward of, said second automobile-supporting track, to a point behind said rear wheels and below the plane of the tops of said wheels; a movable track portion; means for securing said latter portion between the rear extremity of the second automobile supporting track and the forward extremity of the third automobile supporting track to form one continuous track for loading purposes; and means for supporting said movable track portion in alignment with and in front of said third automobile supporting track to carry the forward portion of a third automobile above the rearward portion of the second automobile when travelling.

2. An automobile transporting truck comprising: a chassis; front wheels supporting the front end of said chassis; rear wheels supporting the rear end of said chassis; a first automobile-supporting track extending substantially horizontally between said front and back wheels to carry a first automobile; a second automobile-supporting track positioned above said first track to carry a second automobile above the first automobile, said second track extending substantially horizontally from a position over said front wheels and forwardly of the forward extremity of said first track and terminating at its rear extremity forward of the rear extremity of said first track; a third automobile-supporting track extending from a position above the rear extremity of said second track rearwardly and downwardly to a point rearward of said rear wheels and below the plane of the tops of said wheels to carry a third automobile; pivot means supporting said third automobile-supporting track intermediate its extremities, said pivot means being positioned in the plane of said second automobile supporting track and rearwardly thereof so that the forward extremity of the third track may be swung downwardly into alignment with the second track for loading purposes.

EDWARD V. GARNETT.

REFERENCES CITED

The following references are of record in the file of this patent:

UNITED STATES PATENTS

| Number | Name | Date |
| --- | --- | --- |
| 1,809,557 | Lishon | June 9, 1931 |
| 2,385,115 | Stuart | Sept. 18, 1945 |